United States Patent [19]

Seo et al.

[11] Patent Number: 5,574,272

[45] Date of Patent: Nov. 12, 1996

[54] DATA SYMBOL READER

[75] Inventors: Shuzo Seo; Makoto Mogamiya, both of Tokyo, Japan

[73] Assignee: Asahi Kogaku Kogyo Kabushiki Kaisha, Tokyo, Japan

[21] Appl. No.: 439,648

[22] Filed: May 12, 1995

[30] Foreign Application Priority Data

May 13, 1994 [JP] Japan .................................. 6-124657

[51] Int. Cl.⁶ ..................................................... G06K 7/10
[52] U.S. Cl. ........................... 235/454; 235/472; 235/495; 235/483; 235/484; 235/485; 250/566
[58] Field of Search ...................................... 235/454, 472, 235/495, 483, 484, 485; 250/566

[56] References Cited

U.S. PATENT DOCUMENTS

| | | | |
|---|---|---|---|
| 3,238,501 | 3/1966 | Mak et al. | 235/495 X |
| 5,191,199 | 3/1993 | Elko | 235/483 |
| 5,399,852 | 3/1995 | Zheng et al. | 250/566 X |
| 5,408,084 | 4/1995 | Brandorff et al. | 250/566 X |
| 5,428,212 | 6/1995 | Tani et al. | 235/472 |

FOREIGN PATENT DOCUMENTS

| | | |
|---|---|---|
| 4356318 | 8/1994 | Japan . |
| 2248943 | 4/1992 | United Kingdom . |

*Primary Examiner*—Donald T. Hajec
*Assistant Examiner*—Michael G. Lee
*Attorney, Agent, or Firm*—Greenblum & Bernstein, P.L.C.

[57] ABSTRACT

A data symbol reader which reads a two-dimensional data symbol includes a reading device which receives light reflected from the data symbol, a casing in which the reading device is provided, and a guide member which defines a symbol reading area in which the data symbol can be positioned. The guide member is attached to the casing and is moveable between a fisrt postion in witch the position of the data symbol realative to the symbol reading area can be viewed from the exterior of the data symbol reader, and a second position in whitch the data symbol can be read by the the reading device in the casing.

11 Claims, 10 Drawing Sheets

DATA SYMBOL READER

BACKGROUND OF THE INVENTION

1. Field of the Invention

The present invention relates to a data symbol reader which reads coded data, such as a two-dimensional data symbol.

2. Description of the Related Art

For instance, in a POS system, a bar code which represents sales information of merchandise is read by a bar code reader. However, the bar code is scanned with a scanning beam only in one direction (one-dimensional), i.e., the direction of the alignment of the bars which form the bar code. Consequently, the amount of data that can be recorded is limited.

To increase the amount of data to be transmitted, a data symbol reader which reads a two-dimensional data symbol consisting of a mosaic pattern of white and black areas having a matrix arrangement has recently been proposed. There are primarily two types of data symbol readers, i.e., in one type the data symbol pattern is read at one time in two orthogonal directions by an area sensor such as a CCD, and in another type each line of the data symbol pattern is scanned by a line sensor in the main scanning direction. In the latter type, the data symbol and the reading portion are relatively moved in the sub-scanning direction perpendicular to the main scanning direction to read the two-dimensional pattern.

In particular, the first type using an area sensor has advantages over the second type, since no relative displacement between the data symbol and the reading portion in the sub-scanning direction is necessary in the first type.

Figure 10:
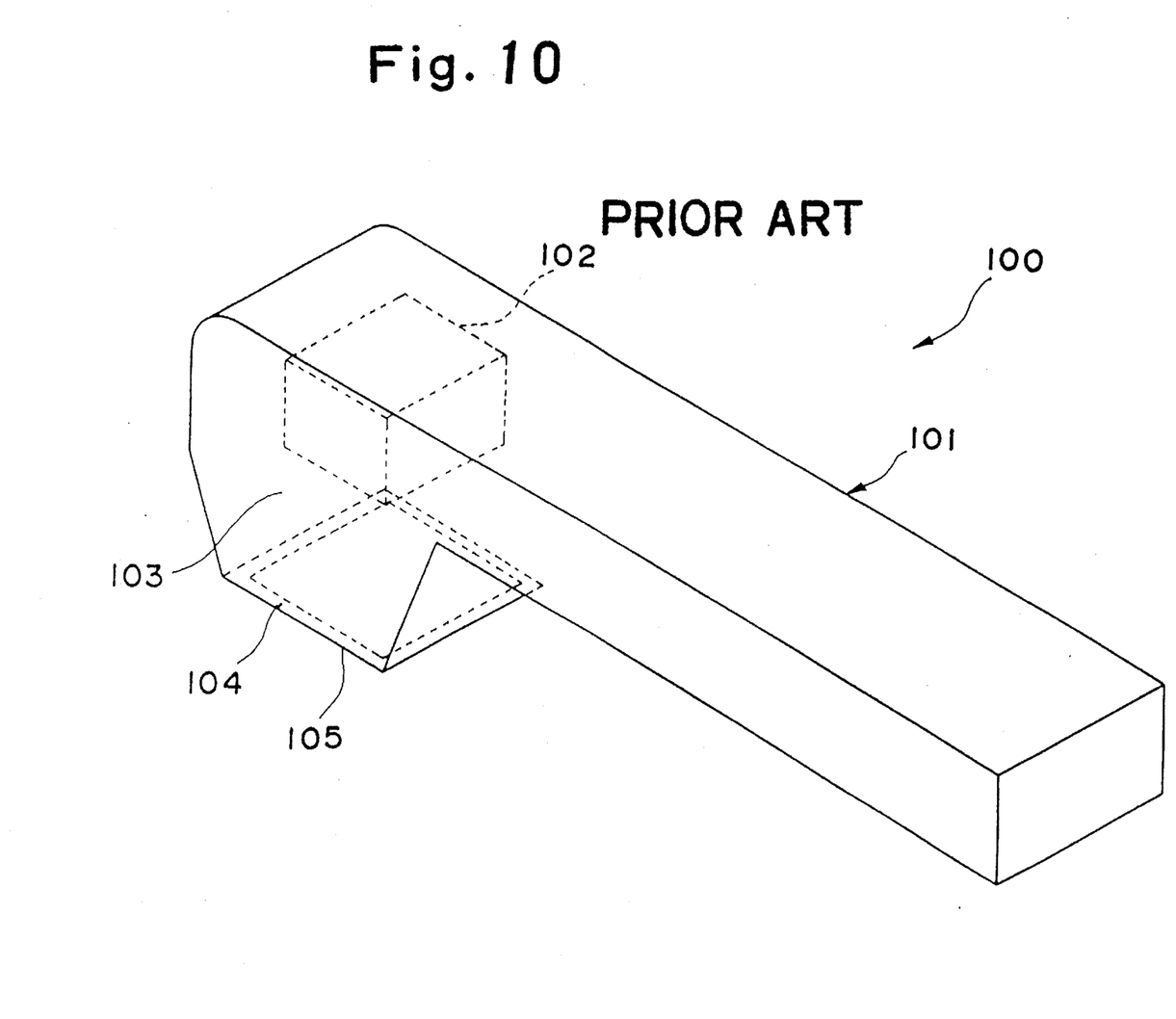

FIG. 10 shows an example of a known data symbol reader that uses an area sensor. In FIG. 10, a data symbol reader 100 is comprised of a body 101 which includes a data symbol reading device 102, and a housing 103 formed integral with the body 101, which defines therein an enclosed interior space between the reading device 102 and a symbol reading area. The housing 103 is provided on the front end thereof with a rectangular opening which contains therein the symbol reading device 102.

Upon reading a data symbol, the data symbol and the data symbol reader are relatively moved so that the data symbol is located within the front opening of the housing 103.

In the arrangement shown in FIG. 10, a precise positioning of the data symbol relative to the symbol reader is necessary to align the data symbol with the opening of the housing 103 so that the entire data symbol is located within the front opening area of the housing. For example, if a part of the data symbol overlaps the front edge 104 of the housing 103 which defines the front opening, a reading error occurs.

In general, since the housing 103 is made of an opaque material for intercepting light, it is difficult for an operator to visually confirm the relative position of the data symbol to the front opening of the housing. In particular, even if the operator visually confirms that the data symbol is located within the outer edge 105 of the front end of the housing 103, there is still a possibility that the data symbol partly overlaps the inner edge 104 of the front opening of the housing, thus resulting in a reading error.

Under these circumstances, it takes long time to precisely position the data symbol within the front opening of the housing 103 and therefore negates the above-mentioned advantage of the data symbol reader having an area sensor.

SUMMARY OF THE INVENTION

The primary object of the present invention is to provide a simple data symbol reader which can quickly and correctly read a data symbol.

To achieve the object mentioned above, according to the present invention, there is provided a data symbol reader which reads a two-dimensional data symbol, comprising a reading device which receives light reflected from a data symbol, a casing in which the reading device is provided, and a guide member which defines a symbol reading area. The guide member is attached to the casing and is movable between a first position in which the position of the data symbol relative to the symbol reading area can be viewed from the exterior of the data symbol reader, and a second position in which the data symbol can be read in the reading device in the casing.

The guide member can be comprised of a frame member having an opening which defines the symbol reading area. The frame member is attached to the casing to rotate between the first position and the second position.

Alternatively, the guide member can be comprised of a slider having an opening which defines the symbol reading area. The slider is slidable with respect to the casing in the optical axis direction of the reading device.

Preferably, the slider is provided on the side surface thereof with a substantially transparent portion.

Provision is made for a return means for returning the guide member to the first position from the second position. It is also possible to provide a biasing means for biasing the guide member to the first position. The data symbol reader can be comprised of a switch means which commences the reading operation of the reading device when the guide member is moved to the second position from the first position.

According to another aspect of the present invention, there is provided a data symbol scanner which reads a two-dimensional data symbol, comprising a reading means for scanning a specific scanning area at a predetermined distance, a body in which the reading means is provided, a guide member having a transparent portion through which the specific scanning area can be viewed, and a guide mechanism which is supported by the body so as to move the guide member between a first position in which the data symbol can be viewed from the exterior of the guide member and the body through the transparent portion and a second position in which the specific scanning area substantially positions at the predetermined distance.

According to yet another aspect of the present invention, there is provided a data symbol reader which reads a two-dimensional data symbol, comprising a reading device which receives light reflected from the data symbol, a casing in which the reading device is provided, a guide member which defines a symbol reading area in which the data symbol can be positioned, the guide member being movable between a first position in which the position of the data symbol relative to the symbol reading area can be viewed from the exterior of the data symbol reader and a second position in which the reading device can receive light reflected from the data symbol, and a switch means which commences the reading operation of the reading device when the guide member is moved to the second position from the first position.

The present disclosure relates to subject matter contained in Japanese patent application No. 06-124657 (filed on May 13, 1994) which is expressly incorporated herein by reference in its entirety.

BRIEF DESCRIPTION OF THE DRAWINGS

The invention will be described below with reference to the accompanying drawings, in which.

DESCRIPTION OF THE PREFERRED EMBODIMENT

Figure 1:
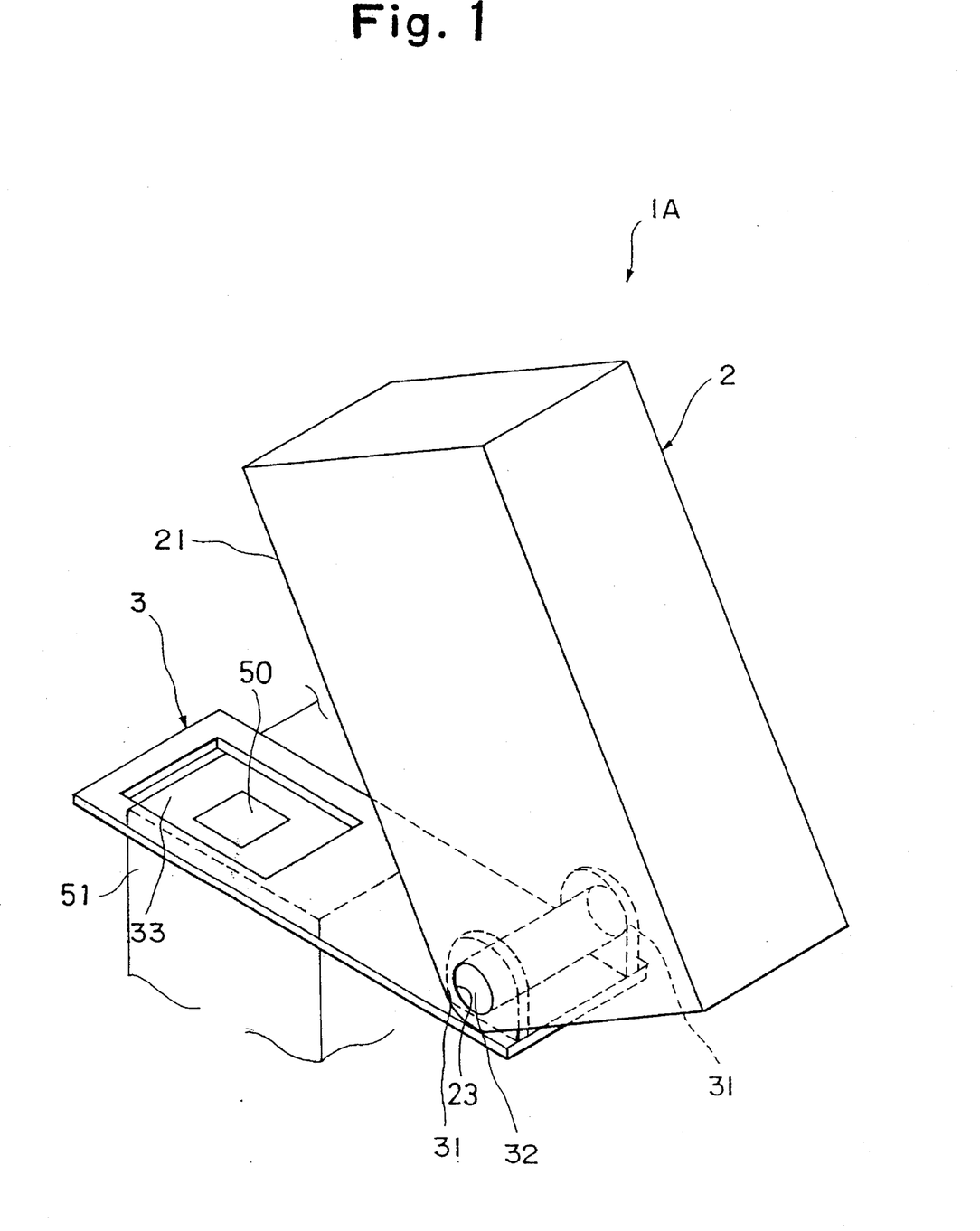
FIG. 1 is a perspective view of a data symbol reader according to the present invention is applied.
Figure 2:
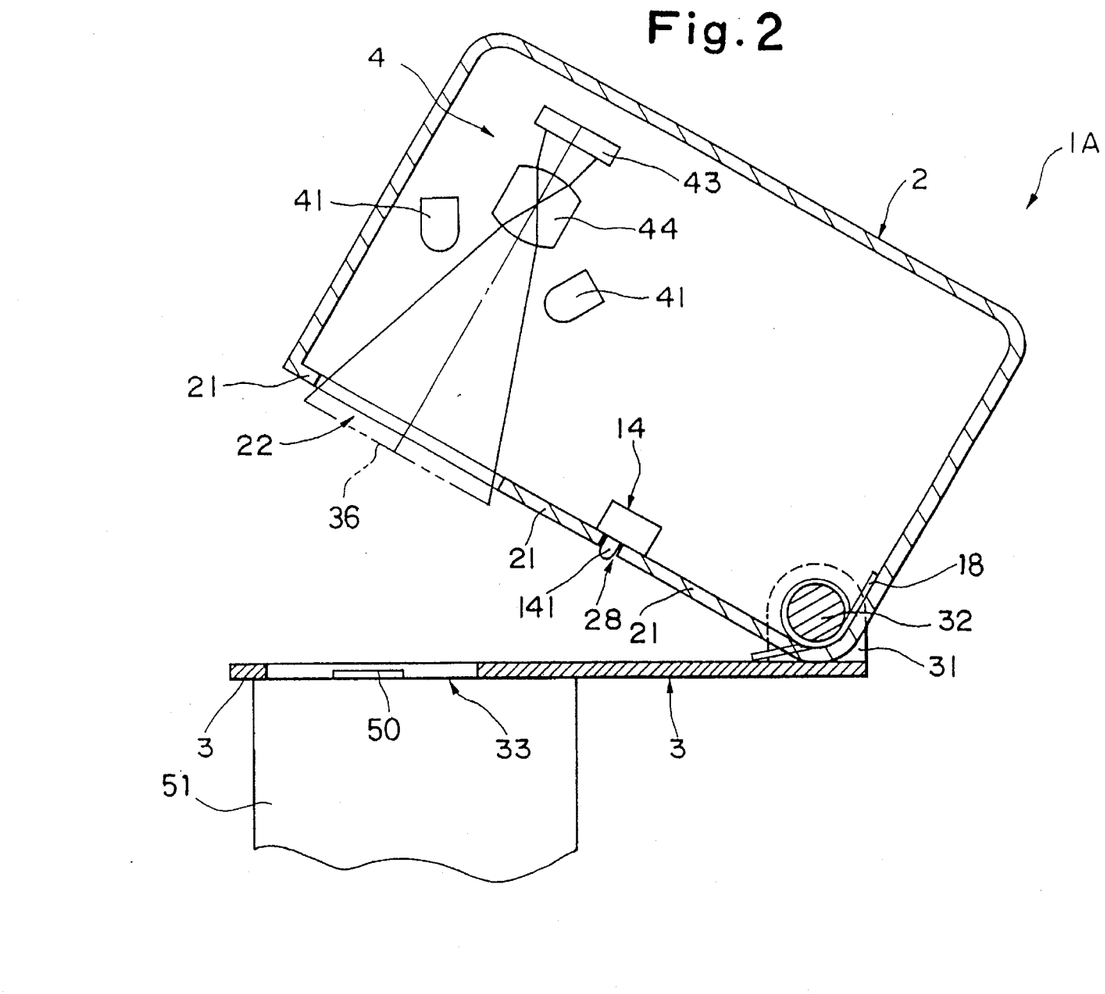
FIG. 2 is a sectional view of a data symbol reader shown in FIG. 1 in a first position.
Figure 3:
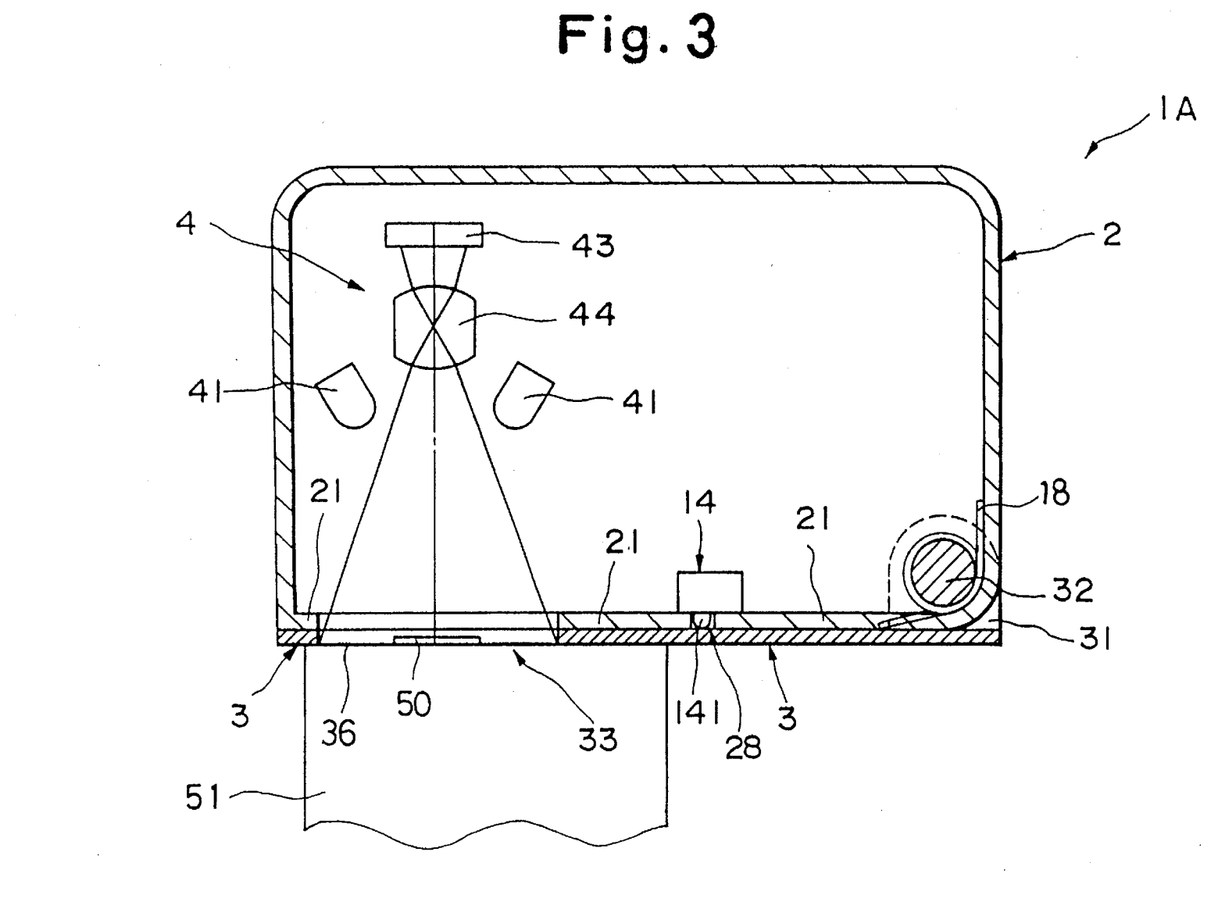
FIG. 3 is a sectional view of a data symbol reader shown in FIG. 2 in a second position.
Figure 4:
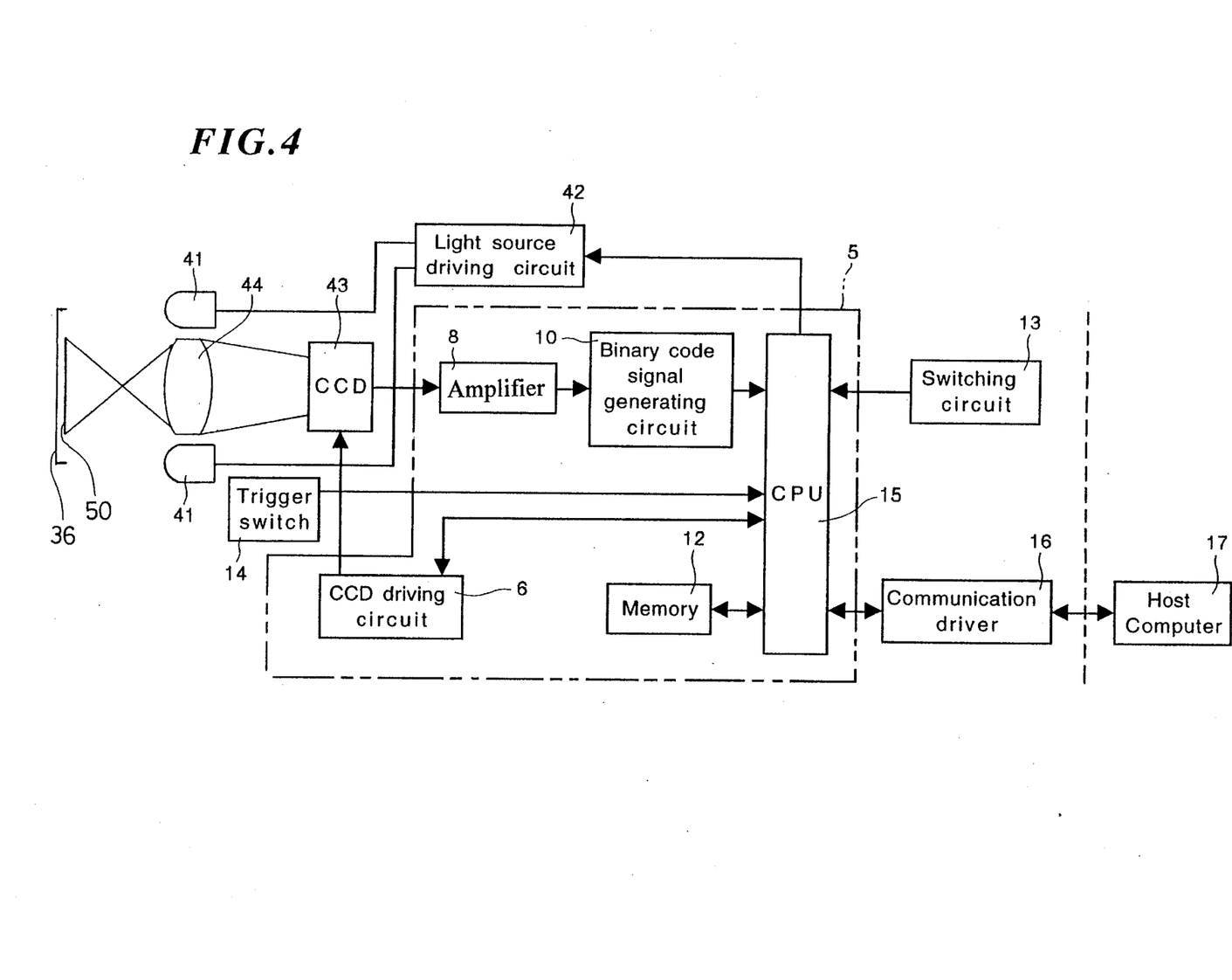
FIG. 4 is a block diagram of a circuitry of a data symbol reader shown in FIG. 1.

FIG. 1 shows a data symbol reader, according to a first embodiment of the present invention. FIGS. 2 and 3 show sectional views of the data symbol reader shown in FIG. 1, at different positions. FIG. 4 is a block diagram of a data symbol reader shown in FIG. 1.

As can be seen in FIG. 1, the data symbol reader 1A is comprised of a casing 2 made of a hard resin or metal material, a frame member (guide member) 3 which defines a symbol reading area.

The casing 2 serves as a holder which can be held by operator's fingers. As shown in FIG. 2, the casing 2 is provided with a bottom plate 21 which has an opening 22 at one end thereof. The opening 22 is shaped such that it is corresponds with an opening 33 formed in the frame member 3 when the latter is located in a second position, which will be discussed hereinafter.

Is shown in FIG.4 There are a signal processing circuit 5, a light source driving circuit 42, a communication driver 16, a reading device 4 which receives light reflected from a symbol reading area 36, and a trigger switch 14, provided in the casing 2. The reading device 4 is located at one end of the casing 2 to face the opening 22. The trigger switch 14 is located on the bottom plate 21 of the casing 2, so that a projection 141 of the trigger switch 14 projects outward from a hole 28 of the bottom plate 21.

The trigger switch 14 is turned ON when the projection 141 is depressed, so that the data symbol reading operation is commenced to read the data symbol 50. The read data is subject to a predetermined signal processing operation in the signal processing circuit 5.

Note that the trigger switch 14 constitutes a switch means that is actuated to begin the reading operation of the data symbol 50 when the frame member 3 is moved to a second position (which will be discussed below).

The reading device 4 is comprised of a pair of light sources (lighting device) 41 which emit illuminating light onto the symbol reading area 36, a CCD (charge-coupled device) 43 as a light receiving element, and an optical system 44 which converges light reflected by the symbol reading area 36 (i.e., light emitted from the light sources 41 and reflected by an outer surface of a packaging box 51 in the illustrated embodiment) onto the CCD 43.

It should be noted that when the casing 21 is at the second position and the data symbol 50 is positioned within the data reading area 36 which is located at a distance from the optical system 44 an image of the data symbol 50 is formed on the CCD 43 through the optical system 44.

The CCD 43 and the optical system 44 are provided between the light sources 41. The CCD 43 is comprised of a large number of picture elements (pixels) having a matrix arrangement and accumulates electric charges corresponding to the quantity of light received by the picture elements. The electric charges accumulated by the picture elements are successively transferred at a predetermined time. The transferred charges form image signals of an image read by the data symbol reader.

In the illustrated embodiment, the CCD 43 detects the brightness (luminance) of each section of the data symbol 50. A CCD for a color picture can also be used, depending on the structure of the data symbol to be read.

The optical system 44 is comprised of a combination of optical elements, such as a lens (or lenses), a prism (or prisms), a filter (or filters), and a mirror (or mirrors), etc.

A light emitting element, such as an LED, a halogen lamp, or a semiconductor laser, etc., can be used as the light sources 41. It is possible to provide diffusers having rough or irregular surfaces (not shown) on the front surface of the light sources 41 for ensuring uniform brightness of the symbol reading area 36. The light sources 41 are connected to the light source driving circuit 42 (FIG. 4) to drive the light sources.

Figure 5:
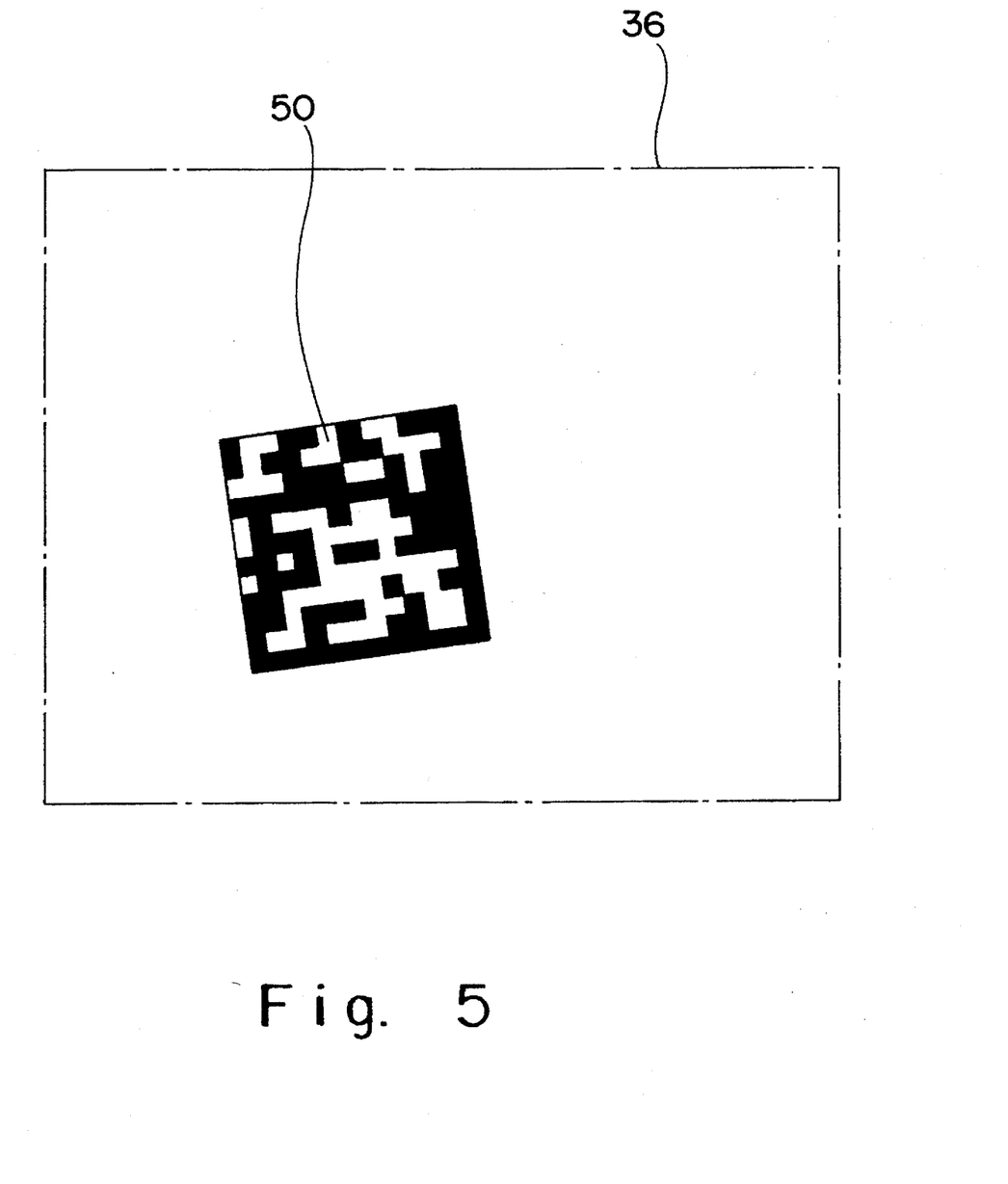
FIG. 5 is a plan view of a symbol reading area in the present invention, by way of example.

As can be seen in FIG. 5 which shows a plan view of a symbol reading area 36 (indicated by a dotted and dashed line), the latter is illuminated with light emitted from the light sources 41 on a reference plane in which the data symbol 50 lies). The light reflected from the data symbol 50 is received by the CCD 43, so that data represented by the data symbol can be read.

In the illustrated embodiment, the data symbol 50 consists of a mosaic pattern of white (or transparent) and black areas having a matrix arrangement (x-lines x y-columns, wherein x and y are integers equal to or greater than 2). The data symbol 50 is printed on an outer surface of a package 51. Each of the "black" or "white" areas represents, for example, the binary number "0" or "1" so that desired information can be obtained by a combination of the signals "0" and "1". Note that the data symbol 50 is not limited to the type as discussed above.

In the reading device 4 as constructed above, the light sources 41 are driven by the light source driving circuit 42 to emit light toward the data symbol reading area. The light reflected by the object (e.g., the outer surface of the package 51) within the symbol reading area 36 is converged onto the light receiving surface of the CCD 43 through the optical system 44. Thus, the image signal (analogue signal) corresponding to the quantity of light received is produced.

As shown in FIG. 1, the frame member 3 is rotatable about the shaft 32 with respect to the casing 2 in which the reading device 4 is provided. The frame member 3 is made of a plate whose shape corresponds to the bottom member 21 of the casing 2. The frame member 3 is provided on one end thereof with the rectangular opening 33 which defines the symbol reading area 36. At the other end of the frame member 3 a pair of opposing supporting members (side plates) 31 that have the shaft 32 extending therebetween are provided. The ends of the shaft 32 project out of the side plates 31, so that the projecting ends are fitted in the corresponding holes 23 formed in the casing 21. Consequently, the frame member 3 is rotatably supported by the side plates 31 through the shaft 32. The frame member 3 is rotated between a first position (open position) shown in FIG. 2 and a second position (closed postion) shown in FIG. 3. The shaft 32 is biased in the second position of the frame member 3 to open the frame member 3 by a coil spring 18 wound around the shaft 32.

Namely, in the first position, the position of the data symbol 50 relative to the symbol reading area 36 can be visually confirmed. In the second position, the data symbol 50 can be read, that is, the light reelected from the symbol reading area 36 is converged onto the light receiving surface of the CCD 43 through the optical system 44.

Note that the first position and the second position are not absolute positions with respect to the symbol reading surface, but relative positions of the frame member 3 with respect to the casing 2.

The signal processing circuit 5 is provided, for example, on a printed circuit board (PCB) within the casing 2 to process the image signals supplied from the reading device 4. As may be seen in FIG. 4, the signal processing circuit 5 is primarily comprised of a CCD drive circuit 6, an amplifier circuit 8, a binary-code signal generating circuit 10, a memory 12, a controller (CPU) 15, and connecting lines, etc.

The light source drive circuit 42, the communication driver 16, the switching circuit 13 including the main switch (power source switch) and the trigger switch 14 are connected to the controller 15. In accordance with need, an indicator, such as an LCD (Liquid Crystal Display) or a CRT maybe connected to the controller 15.

In the data symbol reader 1A, when the trigger switch 14 is turned ON, the reading of the data commences, and the signal processing circuit 5 performs a predetermined signal processing operation. The processed signal is decoded and supplied to an external device 17 such as a personal computer or a work station, etc., through the communication driver 16. In the computer 17, the data input thereto is stored or calculated.

The light source driving circuit 42, which is controlled by the controller 15, supplies the light sources 41 with the electrical power for turning the light sources 41 ON. When the main switch is turned ON, the controller 15 actuates the light source driving circuit 42 to energize the light sources 41. The lighting time of the light sources 41 is appropriately determined by the light source driving circuit 42 or the controller 15.

When the main switch is turned ON, the controller 15 actuates the CCD driving circuit 6. Consequently, the CCD horizontal drive pulses and the CCD vertical drive pulses are supplied from the CCD driving circuit 6 to the CCD 43 to control the charges to be accumulated in and transferred from the CCD.

The CCD driving circuit 6 generates a clock signal, so that a composite clock signal consisting of the clock signal and vertical and horizontal synchronization signals added thereto can be transferred therefrom to the controller 15.

In the binary code signal generating circuit 10, the digital image signal (brightness signal) is compared with threshold value data to obtain binary code data (two gradation white and black signal data). The binary code data obtained is stored in the memory 12 at predetermined addresses designated by an address counter incorporated in the controller 15. The address counter is driven in response to the composite clock signal supplied from the CCD driving circuit 6.

The data stored in the memory 12 is successively read therefrom in accordance with the addresses designated by the address counter. Data for one picture plane is subject to various image processing operations including an outline detection (i.e., extraction of data for the data symbol 50 only), a drop-out correction, rotation, etc., and is then decoded by a decoder incorporated in the controller 15, in accordance with the system of the data symbol 50. The decoded data is sent to the host computer 17 through the communication driver 16.

The data symbol reader 1A mentioned above operates as follows.

Upon reading the data symbol 50 printed on the package 51, a user moves the frame member 3 of the data symbol reader 1A to the first position, as shown in FIG. 2. Thereafter, the user brings the frame member 3 into contact with the package 51 while looking at the data symbol through the opening 33 of the frame member 3, so that the data symbol 50 is located within the opening 33. Consequently, the data symbol 50 is located within the symbol reading area 36.

Thereafter, the casing 2 is manually rotated about the shaft 32 into the second position in which the casing 2 is pressed against the frame member 3, while keeping the frame member 3 in contact with the package 51, as shown in Fig. 3. Consequently, the projection 141 of the trigger switch 14 is depressed by the frame member 3, so that the trigger switch 14 is turned ON. Thus, the reading operation of the data symbol 50 is commenced, and predetermined operations are carried out in the circuits mentioned above.

As can be understood from the foregoing, according to the present invention, since the positioning of the data symbol 50 within the symbol reading area 36 can be visually performed, no deviation of the data symbol from the symbol reading area takes place, and hence, the data symbol 50 can be correctly read. Moreover, according to the present invention, since the opening 33 of the frame member 3 corresponds to the symbol reading area, the above-mentioned positioning can be quickly and easily and effected.

Furthermore, since the trigger switch 14 is turned ON when the frame member 3 is rotated to the second position with respect to the casing 2, there is only one operation necessary to read the data symbol, thus resulting in an enhanced operation efficiency.

It is possible to provide an antislip member on the periphery of the opening 33 to prevent a slippage of the frame member 3 on the reference surface to thereby prevent displacement of the data symbol relative to the opening 33. The antislip member can be made of, for example, a rubber sheet having a high friction coefficient, provided on the lower surface of the frame member 3.

Figure 6:
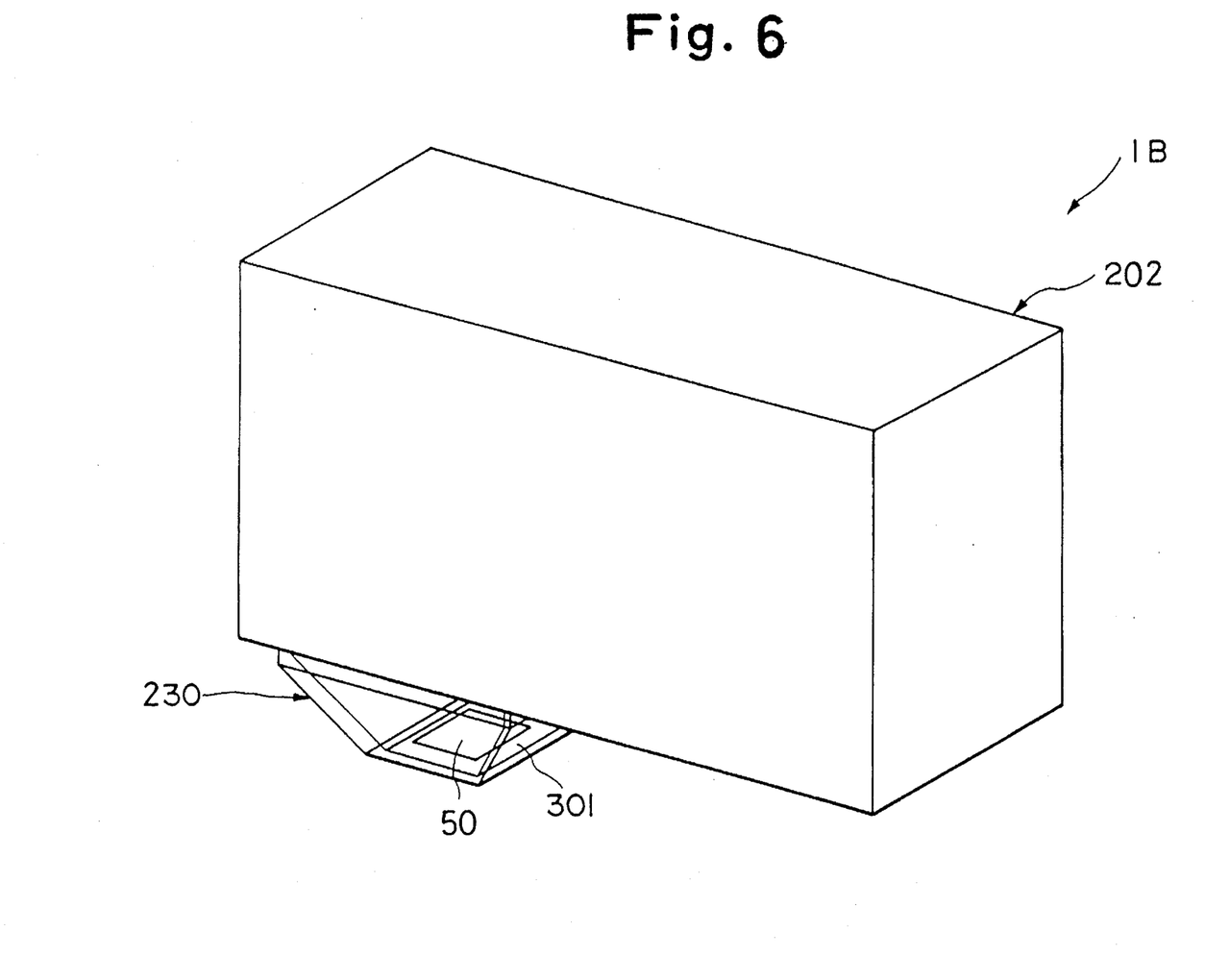
FIG. 6 is a perspective view of a data symbol reader according to another embodiment of the present invention.
Figure 7:
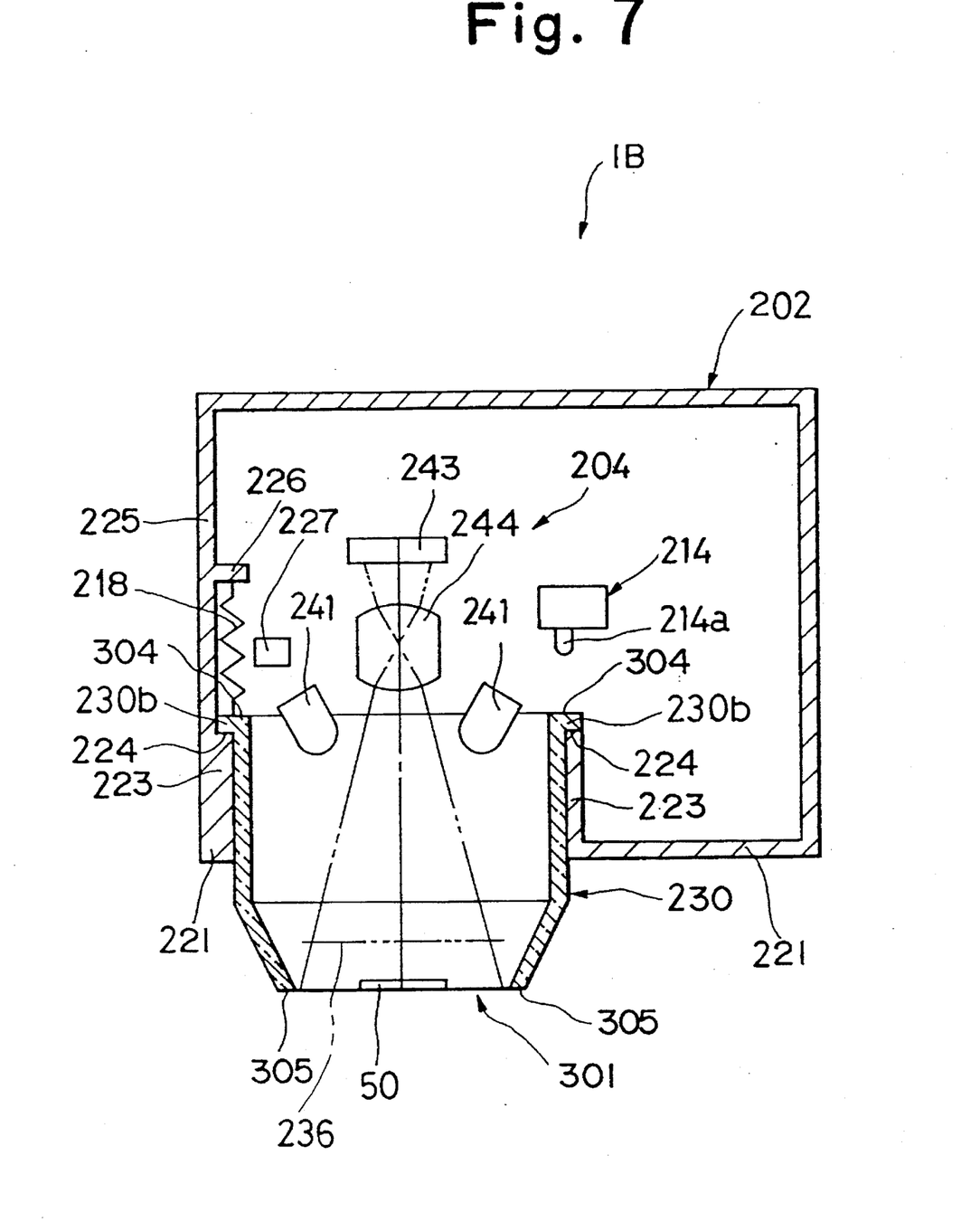
FIG. 7 is a sectional view of a data symbol reader shown in FIG. 6 in a fisrt position.
Figure 8:
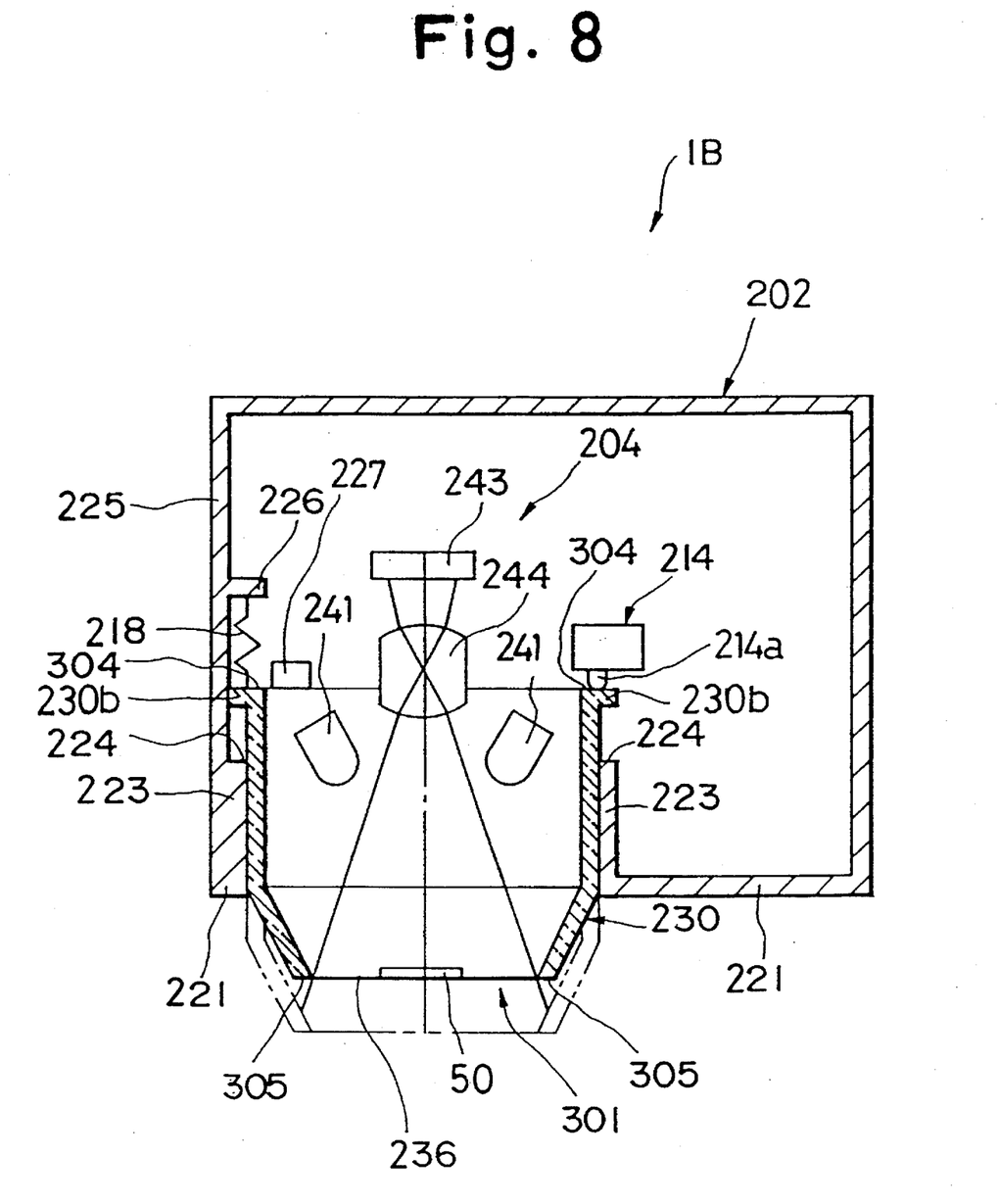
FIG. 8 is a sectional view of a data symbol reader shown in FIG. 6 in a second position.

FIGS. 6, 7 and 8 show a second embodiment of a data symbol reader according to the present invention.

The following discussion will be primarily addressed to differences between the first embodiment and the second embodiment.

As can be seen in FIG. 6, the data symbol reader 1B includes a casing 202 and a housing (slider) 230 which constitutes a guide member for defining the symbol reading area.

The slider 230 is slidable with respect to the casing 202 in the optical axis direction of the reading device 204 (i.e., the optical axis direction of the optical system 244) to selectively occupy a first position shown in Fig. 7 and a second position shown in FIG. 8.

The casing 202 is provided on the bottom portion 221 with a movement restricting portion 223 which extends in the casing 202 to define the path of the linear movement (sliding movement) of the slider 230. The restricting portion 223 has a rectangular inner peripheral surface in a cross section parallel with the symbol reading area 236, so that the cross sectional shape of the restricting portion 223 corresponds to the contour of the slider 230.

There is a positioning member 227 which restricts the movement of the slider 230 for stopping the slider 230 at the second position. Consequently, when the slider moves to the second position, the (inner end surface) 304 of the slider 230 contacts positioning member 227 to stop the movement of the slider 230 at the second position.

The slider 230 defines therein an optical path for light emitted from the light sources 241 and reflected by the symbol reading area 236.

The slider 230 has a rectangular shape in a cross section parallel with the symbol reading area 236 to correspond to the same.

The slider 230 is provided, on the front end thereof, with a rectangular opening 301 which defines the symbol reading area 236, and on the rear end, with a flange 230b which comes into contact with the end surface 224 of the restricting portion 223 to stop the slider 230 at the first position shown in FIG. 7.

The slider 230 is made of a substantially transparent material. This refers to the degree of transparency at which the position of the data symbol 238 can be easily and visually confirmed therethrough. The material includes, but not limited to achromatic transparent material or a colored transparent material which permits only a specific wavelength band of light to be transmitted, absorbed or reflected. Preferably, the transmittance of visible light of the substantially transparent material is more than 50% and even more preferably, more than 70%. The transparent material can be selected, for example, from acrylic resin or glass.

The data symbol reader 1B is provided with a coil spring 218 to return the slider 230 to the first position. The coil spring 218 is connected at one end thereof to the inner end 230b of the slider and at the other end to a projection 226 formed on the side wall 225 of the casing 202, respectively. The coil spring 218 is compressed when the slider 230 is moved to the second position from the first position. Consequently, the slider 230 is biased by the compressed spring 218 in the second position to move toward the first position.

The operation of the data symbol reader 1B will be discussed below.

As shown in FIG. 7, the slider 230 is biased by the coil spring 218 in the direction to project from the casing 202. In this position (first position), the flange 230b abuts against the end surface 224 of the restricting member 223.

Upon reading the data symbol 50, a user brings the front end of the slider 230 into contact with the package 51, while looking at the data symbol 50 through the side wall of the transparent slider 230, so that the data symbol 50 is located within the front opening 301 of the slider 230. As a result, the data symbol 50 is located within the symbol reading area 236.

Thereafter, the user presses the casing 202 toward the symbol reading area 236, while contacting the front end of the slider 230 with the package 51, as shown in FIG. 8. Consequently, the slider 230 is slid into the second position toward the reading device 204 against the biasing force of the coil spring 218. When the inner end surface 304 of the slider 230 abuts against the restricting member 227, the movement of the slider 230 stops at the second position. Thus, the projection 214a of the trigger switch 214 is depressed by the inner end surface 304 of the slider 230, so that the trigger switch 214 is turned ON. As a result, the data symbol 50 is read and the data is subject to the necessary signal processing operations in the circuits.

When the casing 201 is separated from the package 51 after the data symbol 50 is read, the slider 230 is automatically returned to the first position shown in Fig. 7 by the coil spring 218.

As can be understood from the above discussion, according to the present invention, the data symbol reader 1B has the same ease of operation as the data symbol reader 1A according to the first embodiment and, in addition thereto, the on the data reader can be quickly positioned on the symbol 50 for a subsequent reading operation, since the slider is automatically returned to the first (initial) position by the return spring 218.

It is possible to provide an antislip member on the periphery of the opening 301 to prevent the slider from slipping on the reference surface to prevent an displacement of the data symbol relative to the opening 301, similarly as in the first embodiment.

The antislip member can be made of, for example, a layer of rubber having a high friction coefficient, provided on the front edge 305 of the slider 230.

The present invention is not limited to the illustrated embodiments. For instance, it is possible to provide a return means in the data symbol reader 1A of the first embodiment to return the frame member 3 to the first (initial) position. The return means can be embodied, for example, by a torsion spring provided between the casing 2 and the frame member 3 to bias the frame member 3 toward the open position. The return means in the first or second embodiment is not limited to a torsion or coil spring, and can be realized, for example, by a resilient member made of rubber.

Figure 9:
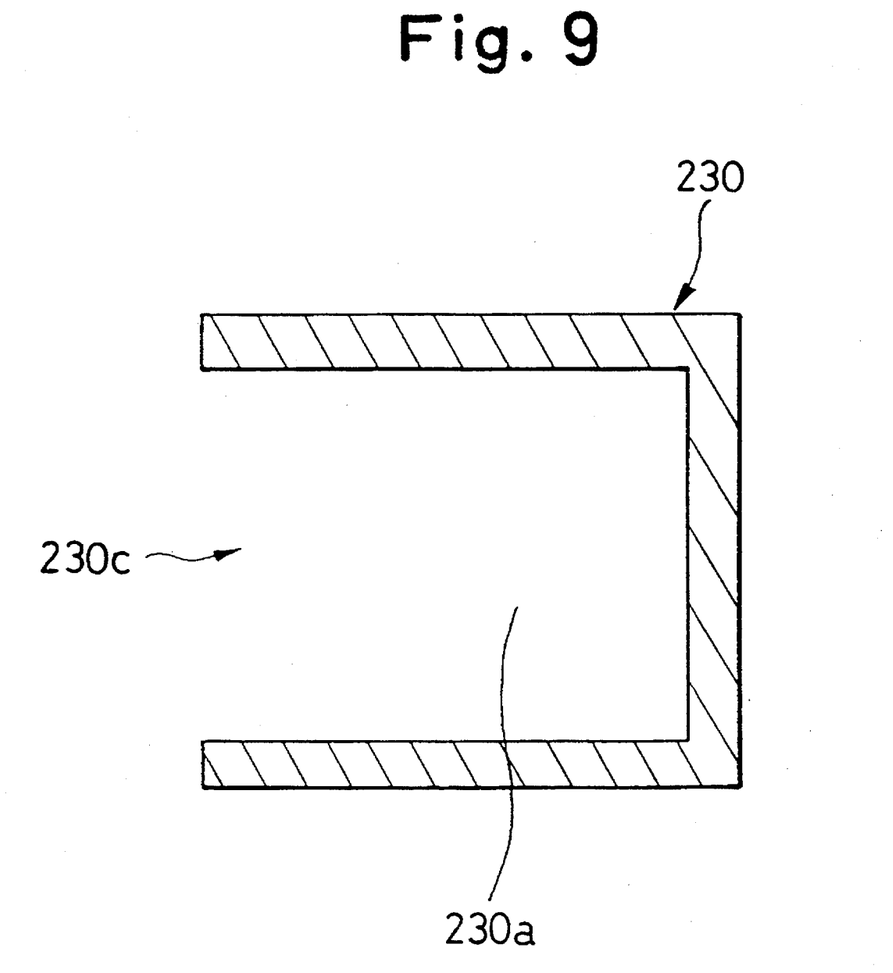
FIG. 9 is a cross sectional view of a housing of a data symbol reader according to the present invention, by way of example; and, FIG. 10 is a perspective view of a known data symbol reader.

In the data symbol reader 1B according to the second embodiment, the slider 230 is provided, at least on the side wall thereof, with a substantially transparent portion. The transparent portion can be replaced with a rectangular opening 230c formed on the side wall of the slider 230, as shown in FIG. 9 (cross-sectional view).

Although the symbol reading area is defined by the through opening in the above-mentioned embodiments, the present invention can be equally applied to a symbol reading area which is defined by a window having a transparent plate or lens, etc.

The trigger switch is not limited to those in the illustrated embodiments. For example, the trigger switch can be replaced with a mechanical switch which is directly actuated by the movement of the guide member. Alternately, it is also possible to use various position sensors in combination with the trigger switch.

Moreover, in the present invention, the switching means which is associated with the operation of the guide member can be altered or elmented. In this alternative, the reading of the data symbol is commenced in accordance with the operation of another trigger switch.

The opening 33 (or 301) of the frame member 3 (or the slider 230), and the opening of the casing 2 (or 202) are not limited to a rectangular shape, but can be any shape including polygonal, triangular, hexagonal, or octagonal or a circular or elliptical shape.

The movement of the guide member relative to the casing is not limited to a rotational movement or sliding movement as in the illustrated embodiments, and can be of any kind of movement between the first position and the second position.

It is possible for the reading device 4 (or 204) not to have a light source 41 (or 214). In this alternative, the symbol reading area 36 (or 236) will be illuminated with external light (natural light).

As can be seen from the foregoing, according to the present invention, since the position of the data symbol can be visually confirmed at the first position, quick positioning of the data symbol reader with respect to the data symbol to be read can be easily effected. Furthermore, no reading errors occur which would otherwise be caused when the data symbol is incorrectly positioned within the symbol reading area, thus resulting in a precise detection of the data symbol.

We claim:

1. A data symbol reader for reading a two-dimensional data symbol, comprising:
   a reading device, said reading device receiving light reflected from said data symbol;
   a casing in which the reading device is positioned; and
   a guide member, said guide member defining a symbol reading area in which said data symbol can be positioned;
   said guide member being attached to said casing and moveable between a first position in which a position of said data symbol relative to said symbol reading area can be viewed from an exterior of said data symbol reader, and a second position in which said data symbol can be read by said reading device in said casing.

2. A data symbol reader according to claim 1, wherein said guide member is comprised of a frame member having an opening which defines said symbol reading area.

3. A data symbol reader according to claim 2, wherein said frame member is attached to said casing to rotate between said first position and said second position.

4. A data symbol reader according to claim 1, wherein said guide member is comprised of a slider having an opening which defines said symbol reading area.

5. A data symbol reader according to claim 4, wherein said slider is slidable with respect to said casing along a direction of an optical axis of said reading device.

6. A data symbol reader according to claim 5, wherein a substantially transparent portion is provided on the side surface of said slider.

7. A data symbol reader according to claim 1, further comprising return means for returning said guide member to said first position from said second position.

8. A data symbol reader according to claim 1, further comprising biasing means for biasing said guide member to said first position.

9. A data symbol reader according to claim 1, further comprising switch means for commensing a reading operation of said reading device when said guide member is moved to said second position from said first position.

10. A data symbol scanner for scanning a two-dimensional data symbol, comprising;
    reading means for scanning a specific scanning area at a predetermined distance;
    a body in which said reading means is positioned;
    a guide member which defines said specific scanning area, said guide member having a transparent portion through which said specific scanning area can be viewed; and
    a guide mechanism, said guide mechanism supported by said body to move said guide member between a first position in which said data symbol can be viewed from an exterior of said guide member and said body through said transparent portion, and a second position in which the specific scanning area is substantially positioned at the predetermined distance.

11. A data symbol reader for reading a two-dimensional data symbol, comprising:
    a reading device, said reading device receiving light reflected from said data symbol;
    a casing in which said reading device is positioned;
    a guide member which defines a symbol reading area in which said data symbol can be positioned, said guide member being movable between a first position in which a position of said data symbol relative to said symbol reading area can be viewed from an exterior of said data symbol reader, and a second position in which said reading device can receive light reflected from said data symbol; and
    switch means for commencing a reading operation of said reading device when said guide member is moved to said second position from said first position.

* * * * *

UNITED STATES PATENT AND TRADEMARK OFFICE
CERTIFICATE OF CORRECTION

PATENT NO. : 5,574,272
DATED : November 12, 1996
INVENTOR(S) : S. SEO et al.

It is certified that error appears in the above-indentified patent and that said Letters Patent is hereby corrected as shown below:

On the cover, in section [57], "ABSTRACT", line 1, change "which reads" to ---for reading---.

On the cover, in section [57], "ABSTRACT", line 2, change "which receives" to ---for receiving---.

At column 9, line 31 (claim 1, line 5), change "positioned;and" to ---positioned; and---.

At column 10, line 35 (claim 11, line 3), change "device,said" to ---device, said---.

Signed and Sealed this

Fifteenth Day of April, 1997

Attest:

BRUCE LEHMAN

Attesting Officer                Commissioner of Patents and Trademarks